United States Patent
Hill et al.

(10) Patent No.: US 8,127,335 B2
(45) Date of Patent: Feb. 28, 2012

(54) COMMUNICATION ERROR MESSAGE FOR TV INTERNET ADAPTER

(75) Inventors: Seth Hill, La Mesa, CA (US); Takashi Hironaka, San Diego, CA (US); Rajesh Rao, San Marcos, CA (US); Yuko Nishikawa, La Jolla, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 908 days.

(21) Appl. No.: 11/934,518

(22) Filed: Nov. 2, 2007

(65) Prior Publication Data

US 2009/0119733 A1    May 7, 2009

(51) Int. Cl.
*H04N 7/173* (2011.01)

(52) U.S. Cl. ........ 725/109; 725/100; 348/552; 348/563; 348/569; 348/705

(58) Field of Classification Search .................. None
See application file for complete search history.

(56) References Cited

U.S. PATENT DOCUMENTS

| | | | |
|---|---|---|---|
| 6,173,422 B1 * | 1/2001 | Kimura et al. ................. 714/57 |
| 7,386,641 B2 * | 6/2008 | Xu et al. ........................ 710/19 |
| 7,701,452 B2 * | 4/2010 | Fujiwara ...................... 345/204 |
| 7,752,675 B2 * | 7/2010 | Lee ................................ 726/26 |
| 2005/0091498 A1 * | 4/2005 | Williams et al. ............ 713/176 |
| 2005/0198673 A1 * | 9/2005 | Kit et al. ........................ 725/68 |
| 2005/0225547 A1 * | 10/2005 | Choi ............................. 345/211 |
| 2005/0232030 A1 * | 10/2005 | Mawatari et al. ......... 365/189.05 |
| 2006/0095623 A1 * | 5/2006 | Nio et al. ...................... 710/260 |
| 2006/0156115 A1 * | 7/2006 | Kim et al. .................... 714/724 |
| 2007/0277205 A1 * | 11/2007 | Grannan ....................... 725/80 |
| 2008/0005620 A1 * | 1/2008 | Walker ............................ 714/43 |
| 2008/0120668 A1 * | 5/2008 | Yau ............................... 725/110 |
| 2008/0247544 A1 * | 10/2008 | Candelore et al. ............ 380/241 |

* cited by examiner

*Primary Examiner* — Andrew Koenig
*Assistant Examiner* — Ricky Chin
(74) *Attorney, Agent, or Firm* — John L. Rogitz

(57) ABSTRACT

A communication error message is displayed on a TV when an error is noted on a control data link between the TV and an Internet adapter module connected thereto.

12 Claims, 3 Drawing Sheets

Communication
error occurs

Communication
error occurs

Communication
error clip message

COMMUNICATION ERROR MESSAGE FOR TV INTERNET ADAPTER

FIELD OF THE INVENTION

The present invention relates generally to communication error messages in TV Internet adapters.

BACKGROUND OF THE INVENTION

TV manufacturers may wish to provide TVs with built-in interactive devices, e.g., personal video recorders (PVR), optical disk players such as Blu-Ray disk players and digital video disk (DVD) players and the like, so that a customer conveniently need purchase only the TV with interactive devices in a single seamless system. As recognized by the present assignee, it would be further desirable to provide the interactive devices with the TV in modular form so that as new and upgraded interactive devices become available, the TV system may be upgraded by replacing an old module with a new one without having to purchase an entirely new TV system, The fusion of television with the Internet is a continuing goal that has spawned systems making it convenient for viewers to access content from both conventional TV sources and the Internet using a single TV. chassis. In this way, the number of programs that can be made available to people using the familiar technology of television can be expanded enormously.

SUMMARY OF THE INVENTION

As understood herein, in a TV Internet adapter that communicates audio video data over a high definition multimedia (HDMI) link to the TV and that exchanges control data with the TV over a universal serial bus (USB) link, if a communication problem occurs over the USB link, it is important to alert the viewer, who otherwise might be at a loss to understand why his entertainment system is not functioning as expected.

Accordingly, a system includes a TV including a TV display, and an Internet adapter module connected to the TV using an audio video link and a control link. The TV is configured to display video received from the module over the audio video link responsive to data carried on the control link. A communication error message is displayed on the TV display at least in response to a malfunction associated with the control link being detected by the TV.

The audio video link can be a high definition multimedia (HDMI) link and the control link can be a universal serial bus (USB) link.

In some implementations a communication error message is not displayed even if a malfunction associated with the control link is detected by the TV if the TV is in a video reception mode that does not implicate the module, or if the nodule is not connected at least over the audio video link with the TV. Also, if desired a communication error message is not displayed on the TV display even if a malfunction associated with the control link is detected by the TV if the error is due to removal of a cable establishing the control link. The communication error message may be displayed regardless of the presence of an error if a user presses a predetermined key on a remote commander.

In another aspect, a tangible digital storage medium is readable by a TV processor to display a communication error message on a TV display associated with a TV that is configured for communicating with an adapter module over at least a video data link and a control data link if a malfunction associated with the control data link is detected by the TV. But this holds true only if the TV is in a video reception mode that implicates the module, and the module is connected at least over the video data link with the TV.

In yet another aspect, a TV includes a TV processor configured for communicating with an adapter module over at least a video data link and a control data link, and a TV display configured for displaying video received on the video data link under control of the TV processor. The TV processor selectively causes a communication error message to appear on the TV display if an anomaly is detected associated with data in the control data link.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
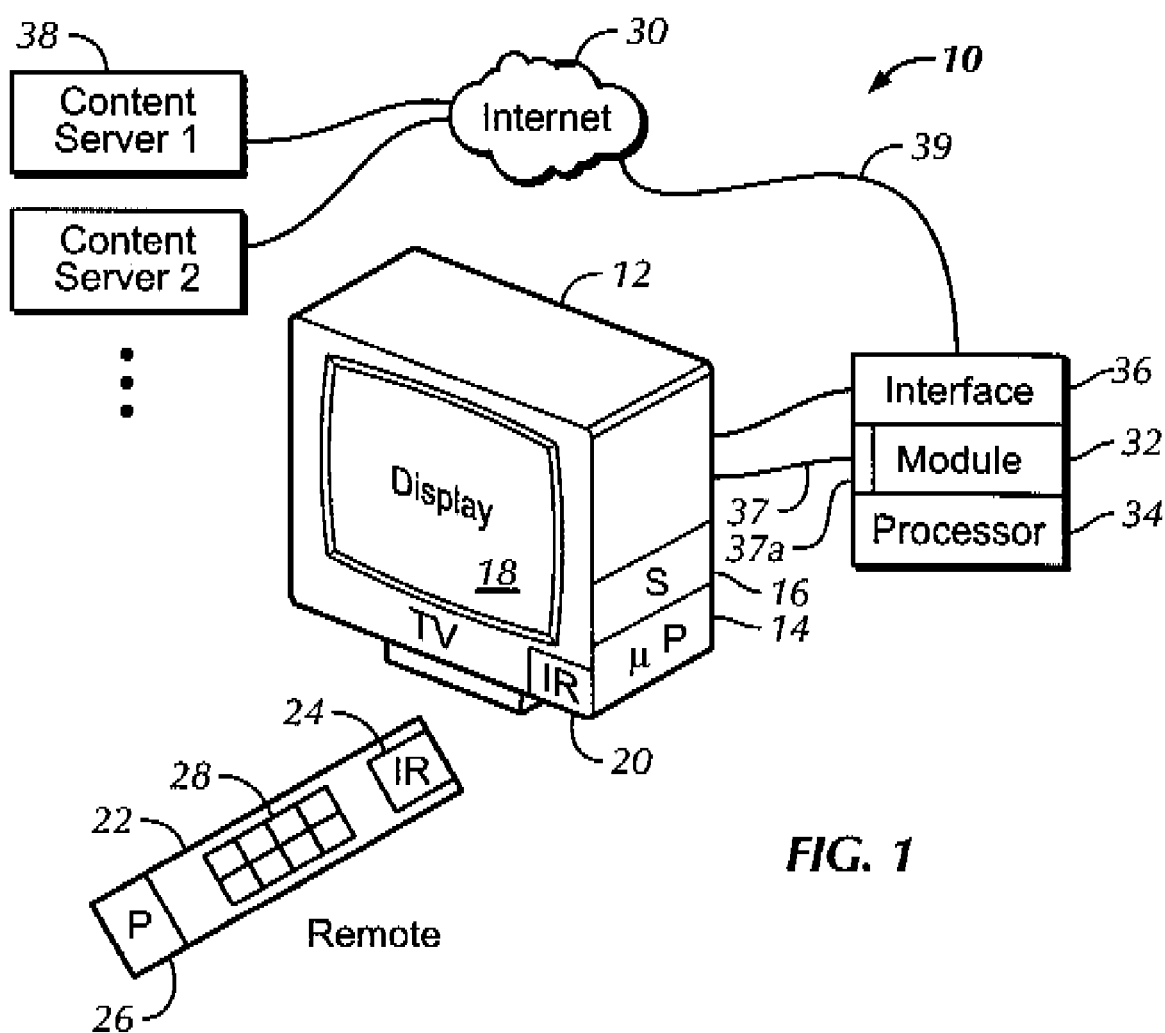
FIG. 1 is a schematic view of a non-limiting system in accordance with present principles.

Referring initially to FIG. 1, a system is shown, generally designated 10, that includes a TV 12 with TV processor 14 and tangible digital storage medium 16 that may be, without limitation, a magnetic or optical disk drive, a solid state device such as random access memory or read-only memory or flash memory, a removable stick medium or removable floppy disk, etc. The medium 16 and processor 14 may be stored in the TV housing as shown along with a display 18 such as but not limited to a high definition (HD) matrix display or a standard definition cathode ray tube display, or the processor 14 and/or medium 16 may be external to the TV housing, e.g., in a set-top box or in the below-discussed module.

The TV 12 typically includes a wireless receiver such as but not limited to all IR receiver 20 for receiving wireless signals from a hand-held remote control 22 having a wireless transmitter such as but not limited to an IR transmitter 24. A processor 26 in the remote control 22 can receive input from a user-manipulable key array 28 in accordance with principles known in the art to cause the transmitter 24 to send wireless signals to the TV 12, including cursor control signals to move a cursor on the display 18.

In the non-limiting embodiment shown in FIG. 1, audio-video content from a wide area computer network such as the Internet 30 can be provided to the TV 12 for presentation on the display 18 using a Internet adapter module 32 that may have a module processor 34. The module 32 may communicate audio video data with the TV 12 using a communication interface 36 such as a high definition multimedia interface (HDMI) to provide content from the Internet to the TV. Also, the module 32 can exchange control information over a control link 37 with the TV by means of a control link interface 37a such as a universal serial bus (USB) interface. This control information may include commands and GUT elements used for display and user interaction.

The module 32, which can be implemented as a set-back box (SBB), may be physically engaged with the housing of the TV 12 with communication being established by respective connectors on the module and TV, or the module 32 may be connected via a cord to the TV 12. In any case, the module 32 can be connected to the Internet typically by a computer cable that extends from the housing of the module 32 to an Internet jack, although the module 32 alternatively may communicate with the Internet wirelessly using, e.g., Wi-Fi.

As set forth further below, audio-video content may he provided from one or more content servers 38 on the Internet 30 via the module 32 for presentation on the TV display 18.

Figure 2:
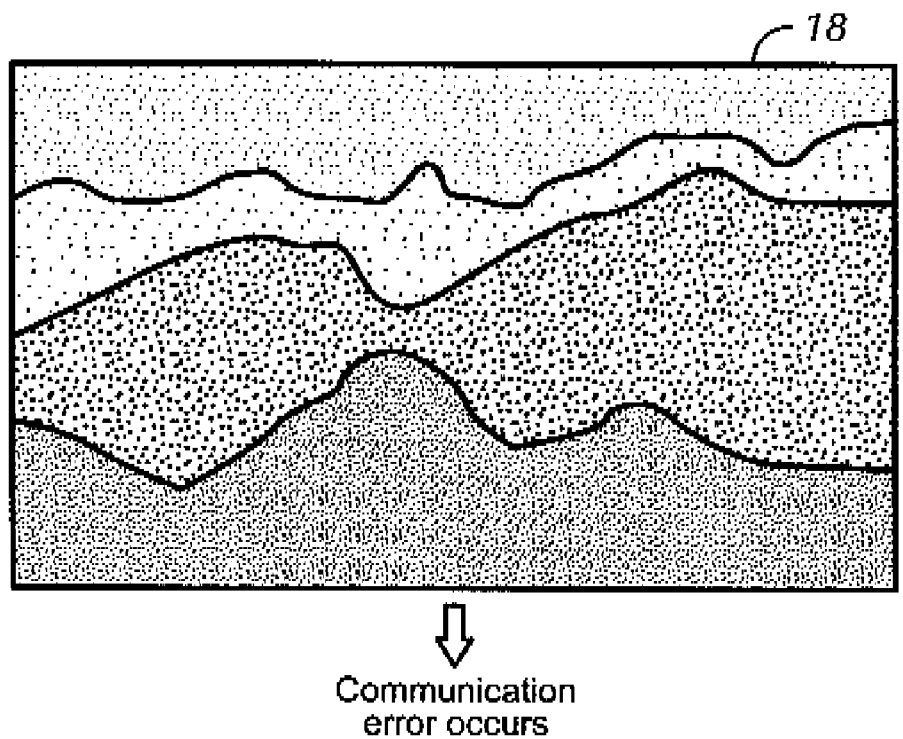
FIG. 2 shows a screen display presenting video from the Internet adapter module.
Figure 3:
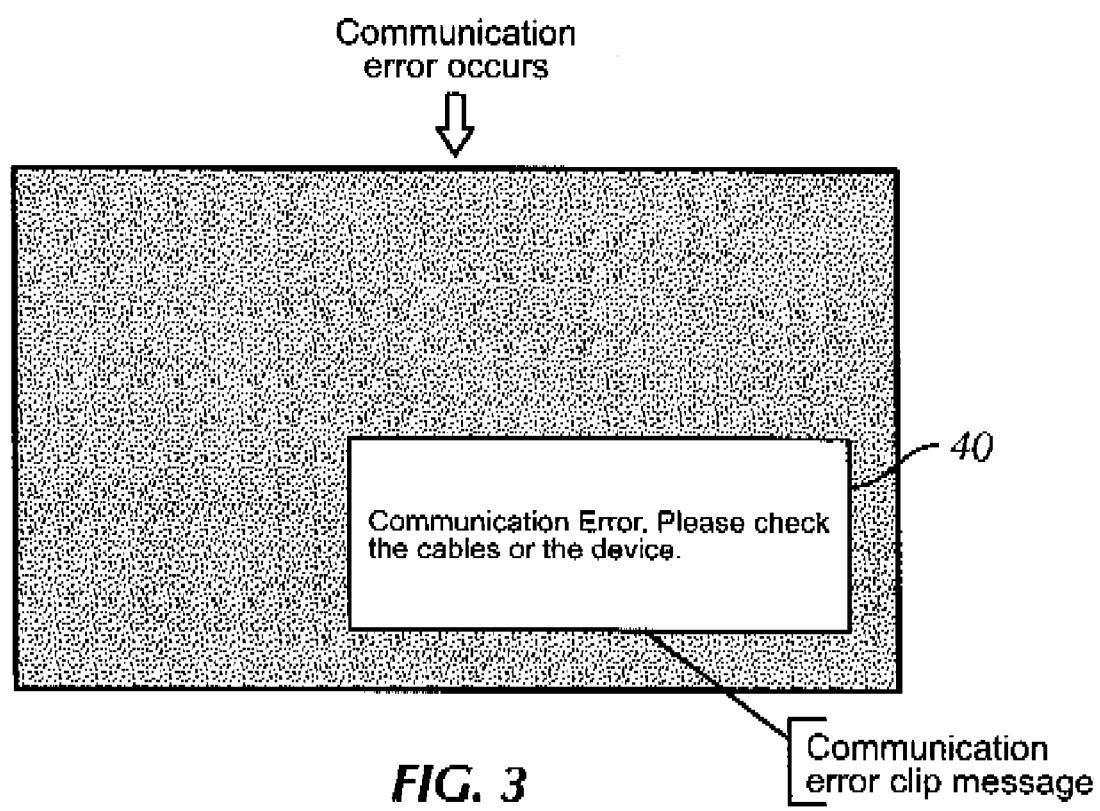
FIG. 3 shows a screen display that has gone black due to a communication error between the adapter module and TV, with an example communication error message displayed.

FIG. 2 shows a video display on the TV monitor 18 that is generated by Internet data received through the module 32 over the HDMI link using control information exchanged over the control link 37. Should a communication error occur, either on the control link 37 or within the software or hardware of the module 32, the display 18 goes black as shown in FIG. 3, and a communication error message 40 is displayed accordingly. In the example shown, the error message 40 contains not just an error message per se but also a suggestion to check the cables (either the USB and/or the HDMI cables, in a wired embodiment) and the adapter 32 itself.

Figure 4:
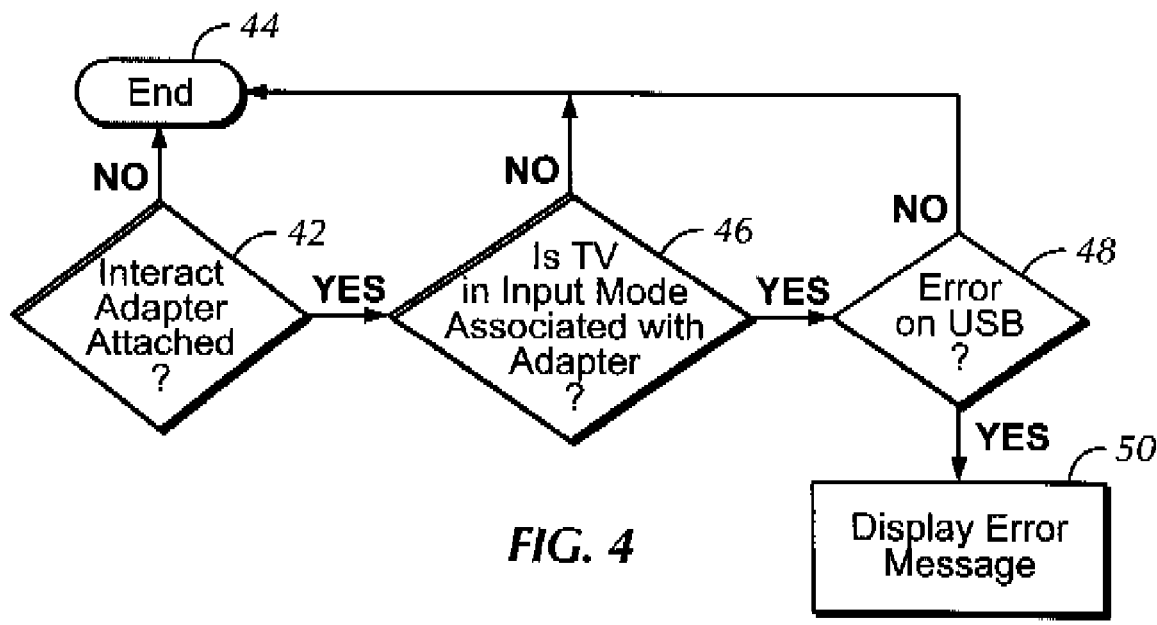
FIG. 4 is a flow chart of non-limiting logic for displaying the error message, which may be undertaken by the TV processor executing code elements stored on a computer readable medium such as the TV storage medium.

FIG. 4, decision diamonds 42 and 46 show that in some embodiments, if the adapter module 32 is not connected at least over the video (e.g., HDMI) link with the TV, or if the TV is in a video reception mode that does not implicate the module 32, e.g., the TV is displaying audio-video data from a satellite or cable head end, the process ends at state 44. Otherwise, if both the above conditions are met and an error occurs at decision diamond 48, an error message such as the message shown in FIG. 3 is presented on the TV display 18.

In some implementations, a TV menu such as a crossmedia bar (XMB) which displays icons associated with categories of audio-video programming regardless of source can be displayed, and if there is a communication error the icons displayed in the XMB that apply to the module 32 may not be immediately removed. In this case, the user may have to reboot the module 32 to remove the icons.

In some implementations, the error message is not displayed if only the USB link 37 is removed. Also, if desired the error message can be displayed if the user presses a predetermined key on the remote commander 22, e.g., the so-called "<DMeX>" key. Also, if entering a module 32-related screen on the TV 12 from a high level portion of the XMB is for some reason not allowed, the error message may be displayed.

While the particular COMMUNICATION ERROR MESSAGE FOR TV INTERNET ADAPTER is herein shown and described in detail, it is to be understood that the subject matter which is encompassed by the present invention is limited only by the claims.

What is claimed is:

1. A tangible non-transitory digital storage medium readable by a TV processor to:
display a communication error message on a TV display associated with a TV configured for communicating with an adapter module over at least a video data link and a control data link if a malfunction associated with the control data link is detected by the TV but only if the TV is in a video reception mode that implicates the module, and the module is connected at least over the video data link with the TV, wherein a communication error message is not displayed on the TV display even if a malfunction associated with the control data link is detected by the TV if the module is not connected at least over the video data link with the TV.

2. The tangible non-transitory digital storage medium of claim 1, wherein the video data link is a high definition multimedia (HDMI) link.

3. The tangible non-transitory digital storage medium of claim 2, wherein the control data link is a universal serial bus (USB) link.

4. The tangible non-transitory digital storage medium of claim 1, wherein a communication error message is not displayed on the TV display even if a malfunction associated with the control link is detected by the TV if the error is due to removal of a cable establishing the control data link.

5. The tangible non-transitory digital storage medium of claim 1, wherein the communication error message is displayed if a user presses a predetermined key on a remote commander.

6. A TV comprising:
a TV chassis;
a TV processor supported by the TV chassis and configured for communicating with an adapter module over at least a video data link and a control data link, the adapter module being physically on or in the TV chassis; and
a TV display configured for displaying video received on the video data link in HDMI format under control of the TV processor, the TV processor selectively causing a communication error message to appear on the TV display if an anomaly is detected associated with data in the control data link, wherein a communication error message is not displayed on the TV display even if a malfunction associated with the control link is detected by the TV if the module is not connected at least over the video data link with the TV.

7. The TV of claim 6, wherein the video data link is a high definition multimedia (HDMI) link.

8. The TV of claim 7, wherein the control data link is a universal serial bus (USB) link.

9. The TV of claim 6, wherein a communication error message is not displayed on the TV display even if an anomaly associated with data in the control data link is detected by the TV if the TV is in a video reception mode that does not implicate the module.

10. The TV of claim 6, wherein a communication error message is not displayed on the TV display even if an anomaly associated with data in the control data link is detected by the TV if the module is not connected at least over the video data link with the TV.

11. The TV of claim 6, wherein a communication error message is not displayed on the TV display even if an anomaly associated with data the control data link is detected by the TV if the error is due to removal of a cable establishing the control data link.

12. The TV of claim 6, wherein the communication error message is displayed if a user presses a predetermined key on a remote commander.

* * * * *